United States Patent [19]
Bulgrien

[11] Patent Number: 5,333,709
[45] Date of Patent: Aug. 2, 1994

[54] SLIPPING CLUTCH CREEPER

[75] Inventor: Garth H. Bulgrien, Ephrata, Pa.

[73] Assignee: Ford New Holland, Inc., New Holland, Pa.

[21] Appl. No.: 992,095

[22] Filed: Dec. 17, 1992

[51] Int. Cl.$^5$ .................... F16H 59/46; B60K 41/02
[52] U.S. Cl. .................................... 74/335; 364/424.1
[58] Field of Search ............... 192/3.58, 0.033, 0.076; 74/335; 364/424.1

[56] References Cited

U.S. PATENT DOCUMENTS

| | | | |
|---|---|---|---|
| 4,513,638 | 4/1985 | Nishikawa et al. | 192/3.58 X |
| 4,529,072 | 7/1985 | Oguma et al. | 192/3.58 X |
| 4,598,611 | 7/1986 | Frank | 74/866 X |
| 4,629,045 | 12/1986 | Kasai et al. | 192/3.58 X |
| 5,012,690 | 5/1991 | Bulgrien | 74/335 |
| 5,074,392 | 12/1991 | Hasegawa et al. | 192/0.076 X |
| 5,083,648 | 1/1992 | Bulgrien | 192/3.58 |
| 5,101,943 | 4/1992 | Bulgrien | 364/424.1 X |
| 5,105,675 | 4/1992 | Langford et al. | 74/335 |

FOREIGN PATENT DOCUMENTS

| | | | |
|---|---|---|---|
| 125927 | 6/1986 | Japan | 192/0.033 |
| 132424 | 6/1986 | Japan | 192/0.033 |
| 120519 | 5/1990 | Japan | 192/0.033 |

Primary Examiner—Leslie A. Braun
Assistant Examiner—Khoi Ta
Attorney, Agent, or Firm—Griffin, Butler, Whisenhunt & Kurtossy

[57] ABSTRACT

In a powershift transmission having electro-hydraulic clutches for selectively connecting an input shaft in driving relationship with an output at any one of a plurality of output to input shaft speed ratios, creeper gear speeds, less than those obtained by selecting the lowest output to input shaft speed ratio, are obtained by placing the transmission in the lowest gear (forward or reverse) and controlling the output shaft speed by automatically controlling clutch slippage. Any one of a plurality of forward or reverse creeper gear speeds may be selected by operation of a gearshift lever. The speeds of the input and output shafts are sensed and a microprocessor responds to the sensed shaft speeds and the selected creeper gear speed to control slipping of the clutch. In one embodiment the output shaft speed is controlled to a specific speed value independent of the input shaft speed. In a second embodiment, the output shaft speed is controlled to obtain a specific ratio of output to input shaft speed.

11 Claims, 3 Drawing Sheets

SLIPPING CLUTCH CREEPER

RELATED APPLICATIONS

This application is related to applications Ser. No. 7/501,573, now U.S. Pat. No. 5,012,690 and Ser. No. 07/645,172, now U.S. Pat. No. 5,083,648, the disclosures of which are incorporated herein by reference.

1. Field of the Invention

The present invention relates to powershift transmissions and more particularly to a method and apparatus for providing a creeper gear capability in transmissions having no creeper gear.

2. Background of the Invention

Slow ground speeds on the order of less than 2 mph are required on some tractors for specific operations. To obtain these slow speeds, transmissions are optionally provided with a creeper gear arrangement which, when active, increases the ratio of input shaft speed to output shaft speed thus providing speeds less than those available with the normal gearing. For example, U.S. Pat. No. 5,105,675 discloses a powershift transmission having 16 forward speeds and 16 reverse speeds and an optional creeper gear arrangement which increases the input to output shaft speed ratio by a factor of 5 to thereby provide an additional 8 forward and 8 reverse creeper gear ratios.

Creeper gear arrangements are an expensive solution for those who require the creeper only occasionally, or who need to go just a little slower than normal gear speeds. Since many creeper operations do not require a high drawbar pull but only slow speeds to manage high power take-off requirements or simply low ground speeds, it would be a distinct advantage to have a low cost creeper arrangement with a limited ability yet capable of satisfying these limited needs.

U.S. Pat. No. 5,012,690 discloses a microprocessor controlled powershift transmission system having 18 forward and 9 reverse gear ratios. The transmission has wet (oil cooled) feathering clutches of the type disclosed in U.S. Pat. No. 5,083,648. These clutches can dissipate a fair amount of power continuously without damage or significant wear. Pressure to the feathering clutches is controlled by the microprocessor and the transmission system includes sensors for sensing the speeds of the transmission input and output shafts. The present invention contemplates programming the microprocessor to automatically control the feathering clutch pressure to obtain output shaft speeds slower than low gear, thereby providing creeper speeds with no addition of hardware to that already available in the system. The drawbar pull capability during creeper operation is limited by clutch wear considerations and clutch oil cooler capacity. However, the creeper capability is sufficient for the limited needs discussed above.

SUMMARY OF THE INVENTION

An object of the present invention is to provide a method and apparatus for obtaining creeper gear speeds in a transmission having no creeper gears.

Another object of the invention is to provide a method and apparatus for controlling a powershift transmission so as to obtain output shaft to input shaft speed ratios less than the lowest gear ratio.

A further object of the present invention is to provide a powershift transmission system having gears and a plurality of clutches for transmitting torque from an input member to an output member, the clutches selectively connecting a rotatable input shaft to a rotatable output shaft at one of a plurality of output to input shaft speed ratios including a lowest speed ratio. Sensors sense the input and output speeds. When an operator selects a desired creeper speed, selection of the creeper speed places the transmission in its lowest gear (forward or reverse) and a microprocessor controls slippage of one of the clutches in response to the desired creeper speed and the input and output speeds sensed by the sensors. In one embodiment the desired output shaft speed is defined by a value representing speed and the output shaft speed is controlled toward that value thus making the output shaft speed independent of the input shaft speed. In a second embodiment the desired output shaft speed is defined by a value representing the desired ratio between output and input shaft speeds and in this case the output shaft speed is dependent on the input shaft speed.

Other objects of the invention will become apparent upon consideration of the following description and the accompanying drawings.

DETAILED DESCRIPTION OF THE INVENTION

Figure 1:
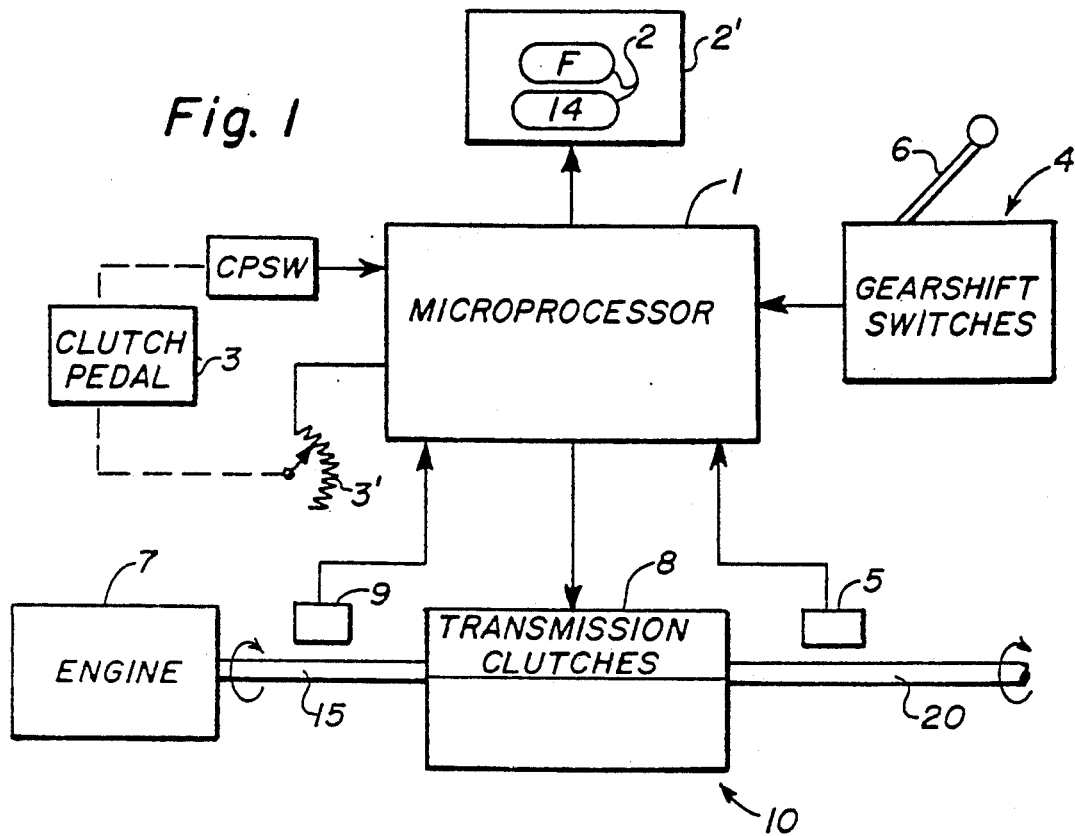
FIG. 1 is a schematic diagram of a powershift transmission system in which the present invention is utilized.
Figure 2:
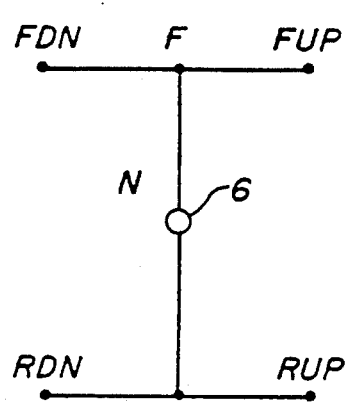
FIG. 2 illustrates the path over which the gearshift lever of FIG. 1 may be moved.
Figure 3:
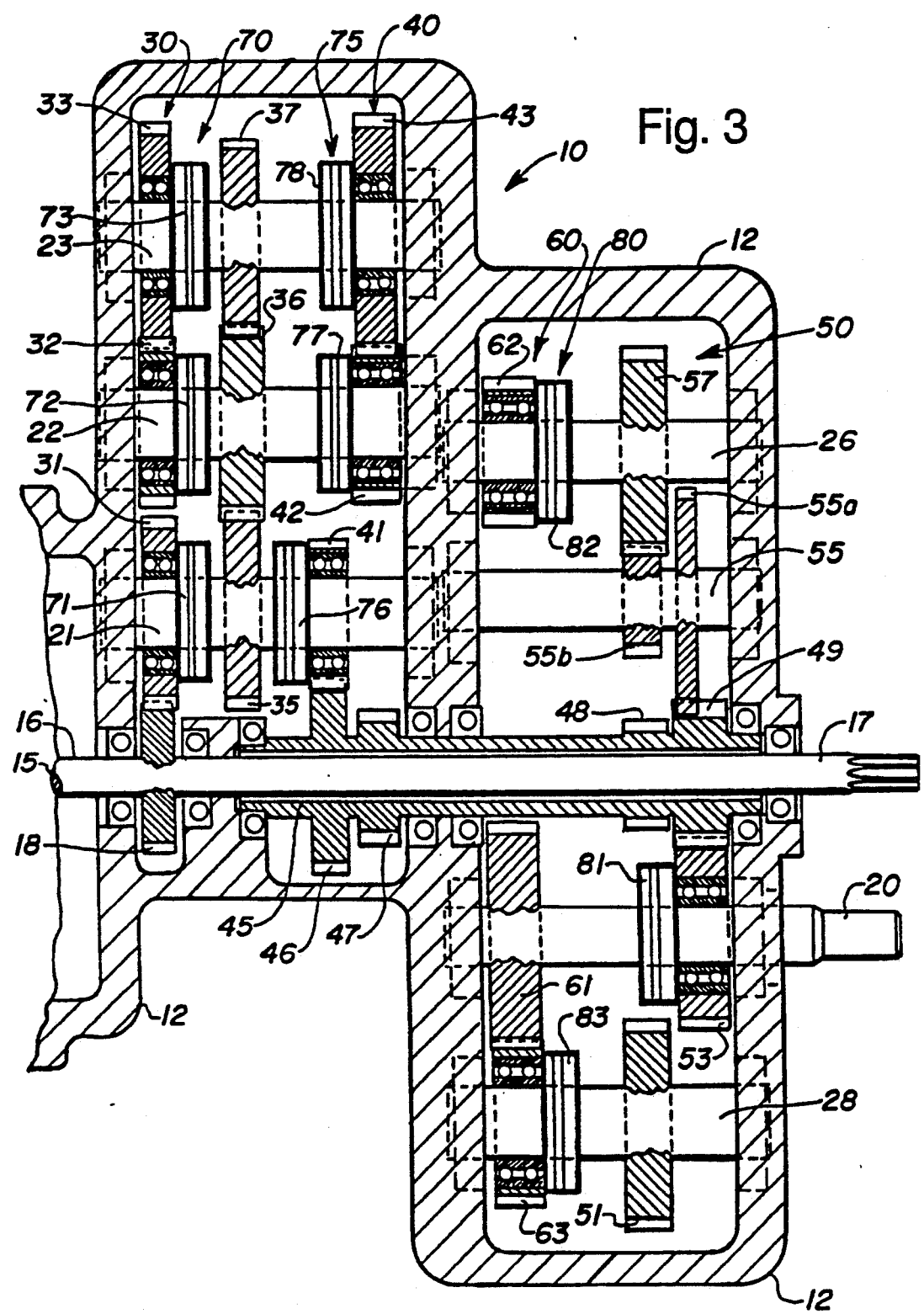
FIG. 3 is a schematic planar development of a powershift transmission having 18 forward speeds and 9 reverse speeds; and, FIG. 4 is a logical flow diagram of a microprocessor Main routine and a Creeper subroutine.

FIGS. 1-3 illustrate a powershift transmission system as disclosed in U.S. Pat. No. 5,012,690. In FIG. 1, the powershift transmission system includes a microprocessor 1, a display 2 on an operator's control panel 2', a plurality of gearshift switches 4 which are selectively actuated by manually moving a gearshift lever 6 over a path as illustrated in FIG. 2, and a plurality of transmission clutches 8 associated with a transmission 10 which transmits power from a rotating power input shaft 15 to a power output or vehicle drive shaft 20. An engine 7 unidirectionally rotates shaft 15 and a sensor 9 senses rotation of shaft 15 to provide output signals representing engine speed. A further sensor 5 provides output signals representing the speed of output shaft 20. An operator-actuated clutch pedal 3 controls a potentiometer 3' and the output signal from the potentiometer is applied to microprocessor 1 to develop modulating signals which are applied to a final set of clutches in transmission 10. The clutch pedal 3 also actuates a clutch pedal switch CPSW when the pedal is depressed to its limit of travel. The control system is admirably suited for controlling the transmission of a tractor but it may also be used to control the transmission of other vehicles or machines. Microprocessor 1 includes means for periodically sampling (at about 10 ms intervals) the clutch pedal switch, the output of potentiometer 3' and the switches 4, and in response to the sensed conditions and the outputs of shaft speed sensors 5 and 9 the microprocessor controls transmission clutches 8 to "select gears", i.e. select the direction and rate of rotation of output shaft 20 relative to input shaft 15.

FIG. 3 is a schematic planar development of a power-shift transmission having 18 forward gear ratios and 9 reverse gear ratios. The transmission is housed in a casing 12 and has a drive shaft 15 with a power input end 16 adapted to be driven by engine 7. The output end 17 of drive shaft 15 serves as a power take-off. An output shaft 20 drives the tractor wheels or other load in a conventional manner.

The transmission 10 has an input clutch section comprising a set 30 of three gears 31, 32, 33 and a set 70 of three clutches 71, 72, 73, a center clutch section comprising a set 40 of three gears 41, 42, 43 and a set 75 of three clutches 76, 77, 78, and an output clutch section comprising a set 60 of two forward gears 53, 62, a set 80 of two forward clutches 81, 82, a reverse gear 63 and a reverse clutch 83.

A drive pinion 18 is rigidly secured to drive shaft 15 and when shaft 15 is rotated pinion 18 drives the gears 31, 32 and 33 which have different numbers of teeth and are mounted for free rotation on shafts 21, 22 and 23, respectively. Electro-hydraulic clutches 71, 72 and 73 are affixed to shafts 21, 22 and 23, respectively, and when one of these clutches is energized it couples drive power from one of the gears 31, 32 or 33 to one of the shafts 21, 22 or 23. The shafts 21, 22 and 23 are coupled together by gears 35, 36 and 37 which are all the same size so that all three shafts are driven at the same speed ratio relative to drive shaft 15, this ratio being determined by which one of the clutches 71, 72 or 73 is energized.

Gears 41, 42 and 43 are differently sized and are mounted for free rotation on shafts 21, 22 and 23, respectively. Clutches 76, 77 and 78 are affixed to shafts 21, 22 and 23, respectively, and may be selectively energized to drive one of the gears 41, 42 or 43 at the speed of the shafts 21, 22 and 23. Gear 42 engages gear 43 which in turn engages a transfer gear 47 fixed on a transfer hub assembly 45. Gear 41 engages a transfer gear 46 fixed on the transfer hub assembly. Therefore, if any one of the gears 41 42 or 43 is driven, all of the gears and the transfer hub assembly 45 are driven.

Since gears 41, 42 and 43 are differently sized, the transfer hub assembly 45 may be driven at one of three speed ratios relative to the shafts 21, 22 and 23. Furthermore, since shafts 21, 22 and 23 may be driven at one of three speed ratios relative to drive shaft 15, because of the differently sized gears 31, 32 and 33, it is clear that the transfer hub assembly 45 may be driven at one of nine speed ratios relative to the drive shaft, the ratio depending on which one of the input section clutches 71, 72 or 73 and which one of the center section clutches 76, 77 or 78 is energized.

The transfer hub assembly 45 is mounted in the casing 12 for free rotation concentric with drive shaft 15 and serves to transfer drive power to the output section. A transfer gear 49, affixed to the transfer hub assembly 45, engages a gear 53 which is mounted for free rotation on output shaft 20. A high speed final clutch 81 is affixed to shaft 20 and when clutch 81 is energized to drive gear 51 the shaft is driven at one of nine high forward speed ratios.

The transfer gear 49 also drives a gear 55a which, with a gear 55b, is attached to a shaft 55. Gear 55b drives a gear 57 which is affixed to a shaft 26. A low speed final clutch 82 is affixed to shaft 26 while a gear 62 is mounted for free rotation on the shaft. When clutch 82 is energized to drive gear 62, gear 62 drives gear 61 which is affixed to the output shaft 20. When the low speed final clutch 82 is engaged, the output shaft 20 is driven at one of nine forward speed ratios designated 1–9.

The transfer hub assembly 45 is provided with a transfer gear 48 which meshes with a gear 51 affixed to a shaft 28. A reverse clutch 83 is affixed to shaft 28. A gear 63 is journalled for free rotation on shaft 28 and meshes with gear 61 so that when the clutch 83 is energized to engage gear 63 the output shaft 20 is driven in the reverse direction at one of 9 reverse speeds designated R4–R12.

All the clutches shown in FIG. 3 are electro-hydraulic clutches of the type described in U.S. Pat. No. 5,083,648. Each clutch includes a first set of clutch plates attached to a drive member and a second set of plates attached to a driven member. For clutch 81, the drive member is gear 53 and the driven member is shaft 20. For clutches 82 and 83 the drive members are shafts 26 and 28 and the driven members are gears 62 and 61. One set of clutch plates is operated by hydraulic pressure to frictionally engage the plates of the two sets thereby transmitting torque from the input member to the output member, The hydraulic pressure is controlled by a solenoid operated valve. In addition, the clutches are hydraulically (oil) cooled.

As disclosed in U.S. Pat. No. 5,012,690, the clutches 81, 82 and 83 serve as "inching" or "feathering" clutches which control the transfer of torque to the output shaft 20. The electrical signals applied to clutches 81, 82 and 83 by microprocessor 1 may be modulated to incrementally vary the pressure applied to the clutch plates therein. As the clutch pedal 3 is depressed, the magnitude of the signal applied to the microprocessor 1 from potentiometer 3' varies. Using this signal, the microprocessor develops a pulse width-modulated signal that is applied to the solenoid of one of the clutches 81, 82 or 83 depending on which gear the transmission is in. By depressing the clutch pedal 3 only part way, an operator may "slip" the active clutch. That is, the resulting hydraulic pressure applied to the clutch plates is reduced such that the clutch plates on the output member slip relative to the clutch plates on the input member. The output shaft 20 thus rotates at a slower speed relative to input shaft 15.

In accordance with the principles of the present invention, creeper gear speeds are obtained by placing the transmission in the lowest gear (either forward or reverse) and, in response to shaft speed indications produced by sensors 5 and 9, slipping the active forward clutch 82 or reverse clutch 83 to maintain either a constant ratio between the input and output shaft speeds or a constant output shaft speed regardless of input shaft speed.

The number of creeper gear speed ratios provided is a matter of design choice limited by the specific clutches employed and the increments in which the clutch pressure may be changed. For purposes of the present invention it is assumed that 8 forward creeper gear speeds (FC1–FC8) and eight reverse creeper gear speeds (RC1–RC8) are provided so that the forward gear speeds, from lowest to highest, are:

FC1,FC2, . . . FC7,FC8,1,2, . . . 18 and the reverse gear speeds are:

RC1,RC2, . . . RC7,RC8,R4,R5, . . . R11, R12

Creeper gear speeds are selected in the same manner as any other gear speed. As explained in U.S. Pat. No. 5,012,690, and as seen in FIG. 2 a forward gear is selected by moving gearshift lever 6 to the F position and then selectively moving it to the FUP or FDN position to increment, or decrement, the gear indication displayed on display 2. A value representing the selected forward gear is stored in a microprocessor memory location FG (Forward Gear). The value in FG is subsequently transferred to a location CG (Current Gear) used in a clutch energization routine executed by microprocessor 1 to control the energization of clutches in the transmission. Reverse gear speeds are selected in substantially the same manner except that selection is accomplished by moving the gearshift lever 6 between positions R, RUP and RDN.

Creeper gear speeds may also be "preselected" in the same manner as any other gear speed by manipulating gearshift lever 6 between the N, NUP and NDN positions. FIG. 11 of U.S. Pat. No. 5,012,690 shows a microprocessor routine for preselecting gears 1-18. It may be modified to accomplish preselection of creeper gear speeds by testing for creeper gear C1 rather than forward gear 1 as the lowest gear.

Figure 4:
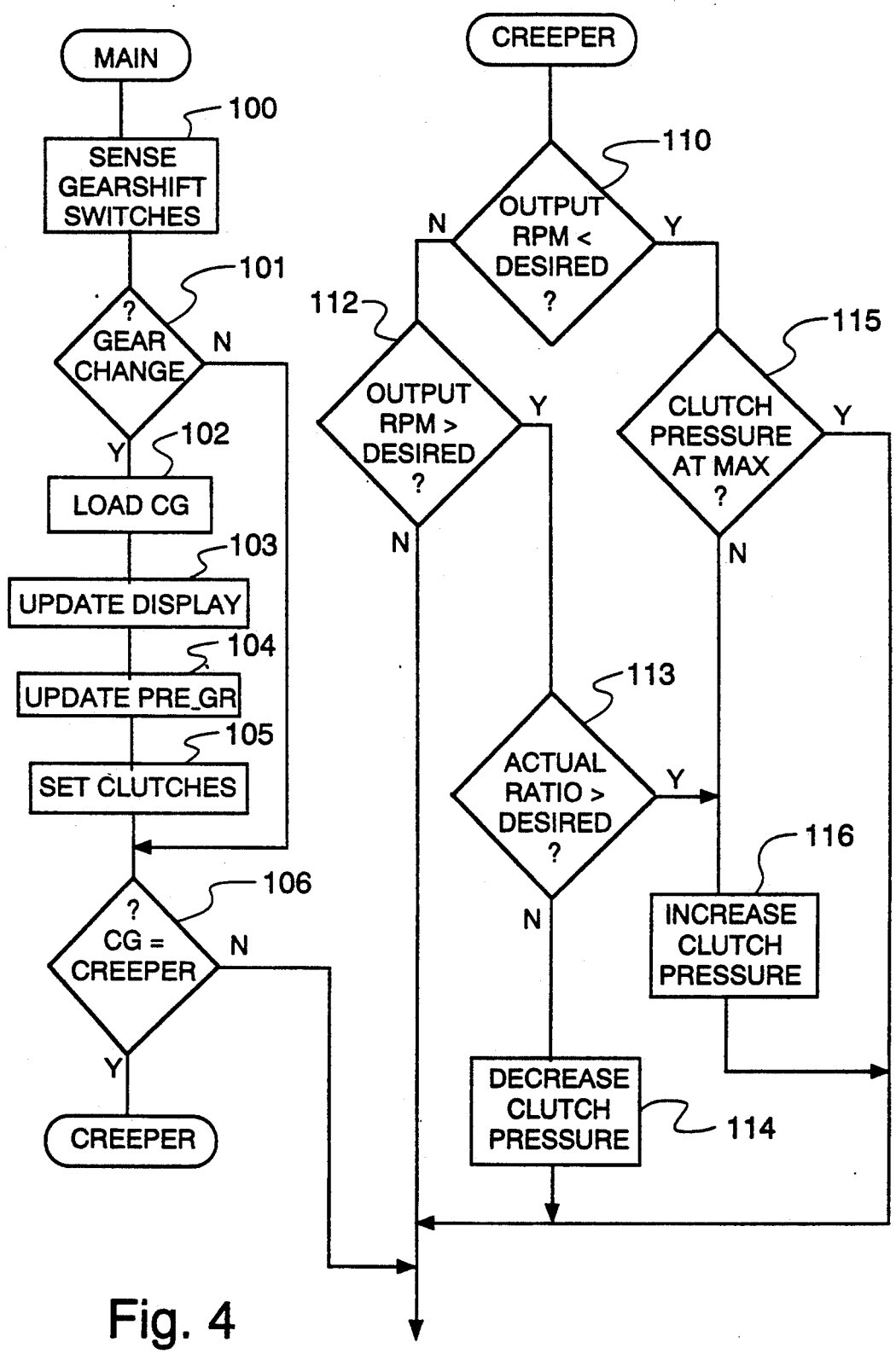

FIG. 4 is a flow diagram illustrating a Main routine and a Creeper subroutine executed by microprocessor 1 to provide creeper gear speeds. Microprocessor 1 executes the Main routine once every 10 ms. As part of the execution of the Main routine the microprocessor executes steps 100-106 as shown in FIG. 4. At step 100, the gearshift lever switches 4 are sensed to determine the position of the gearshift lever 6. After the shift lever position is analyzed to determine the currently selected gear, this selected gear value is compared at step 101 with the contents of a register PREV_GR which holds a value representing the previously selected gear. If there has been no change in the selected gear then the program moves directly from step 101 to step 106.

When the comparison at step 101 shows that there has been a change in gear selection, step 102 loads the current gear register CG with a value representing the gear speed ratio being selected. The display 2 is updated at step 103 and at step 104 the value in CG is saved in the register PREV_GR for use the next time step 101 is executed.

At step 105 the value in register CG is used to set the clutches thereby connecting the input shaft 15 in driving relationship to the output shaft 20. If one of the forward creeper speeds FC1-FC8 is specified by the value in CG then the clutches are set to connect the input shaft to the output shaft at the gear ratio for forward gear 1, that is, the lowest forward output shaft to input shaft speed ratio. On the other hand, if the value in CG specifies one of the reverse creeper gear speeds RC1-RC8, the input shaft is connected in driving relationship with the output shaft at the lowest reverse gear speed ratio R4.

The register CG is then tested at step 106 to determine if the value therein specifies any of the creeper gear speeds FC1-FC8 and RC1-RC8. If it does not, then the Main routine proceeds to steps not relevant to the present invention. On the other hand, if the test at step 106 shows that the currently selected gear speed is a creeper gear speed then the program branches to the CREEPER subroutine.

The purpose of the CREEPER subroutine is to control the clutch pressure in the reverse clutch 83 or the low speed final clutch 82 depending on whether the value entered in register CG at step 102 represents a reverse or a forward creeper gear speed. Since step 105 set the transmission clutches for the lowest forward or reverse output shaft to input shaft speed ratio, the routine controls the clutch pressure so that slipping occurs, thereby producing creeper speeds less than the lowest forward or reverse gear.

The CREEPER subroutine utilizes the outputs of the input shaft speed sensor 9 and the output shaft speed sensor 5. These sensors may be magnetic sensors which sense the passing of teeth on gears mounted on shafts 15 and 20. The microprocessor 1 includes two timers or counters which are incremented at a fixed rate. Each time a sensor senses a gear tooth the microprocessor program is interrupted, the count in the associated counter is saved, and the counter is reset. The saved counts thus represent intervals of time elapsing between the sensing of successive teeth on a gear and are, therefore, indications of the speeds or rates of rotation of the shafts 15 and 20. The count developed from input shaft sensor 9 is saved at a memory location RPM_IN and the count developed from output shaft sensor 5 is saved at memory location RPM_OUT.

The microprocessor 1 includes a non-volatile memory. A table of desired output shaft speed indications is stored in this memory. The table includes sixteen shaft speed indications, one for each forward or reverse creeper speed. These indications may be values representing the counts which would be accumulated between the sensing of successive gear teeth by sensor 5 if the output shaft 20 were rotating at the desired creeper speed.

At step 110 of the CREEPER subroutine, a test is made to determine if the actual speed of output shaft 20 is slower than desired, that is, slower than it should be for the selected creeper speed. This test may be accomplished by using the value in register CG to access the table of desired output shaft speed indications and read therefrom the speed indication for the selected creeper speed. The value read from the table is then compared with the actual output shaft speed saved at location RPM_OUT. If the comparison shows that the output shaft speed is not slower than desired, the program moves to step 112 where the value read from the table is again compared with the actual output shaft speed, this time to determine if the output shaft speed is faster than the desired speed.

If the comparison at step 112 shows that the output shaft speed is not faster than the desired speed then no clutch pressure adjustment is required because the output shaft 20 is rotating at the speed required for the selected creeper speed. The program returns to the Main loop, completes execution of the Main routine, and after 10 ms starts a new execution of the Main routine at step 100. Steps 100, 101, 106, 110 and 112 are thus repeatedly executed as long as the output shaft speed continues to rotate at the desired speed and the operator does not move the gearshift lever 6. Meanwhile, each time one of the sensors 5 or 9 senses a gear tooth, RPM_IN or RPM_OUT is updated.

Assume that the load driven by output shaft 20 increases so as to cause slippage in the active final clutch 82 or 83. The shaft 20 thus rotates at less than the desired speed. Sensor 5 senses the new speed and updates RPM_OUT. The next time step 110 is executed it finds that the output shaft speed is slower than the desired creeper speed. The program then executes step 115 to determine if the clutch pressure being applied to the active final clutch 82 or 83 is the maximum allowable pressure. Step 115 compares the values in memory locations CL_PRES and MAX_PRES where CL_PRES holds a value used to control the clutch hydraulic pressure (by controlling the magnitude of the pulse-width-modulated electrical signal applied to the clutch solenoid) and MAX_PRES is a value representing the maximum clutch hydraulic pressure which may be applied in the active clutch.

If step 115 determines that the clutch pressure being applied to the active clutch is less than the maximum allowable pressure, step 116 is executed to increase the clutch pressure by a small increment by modifying the value in CL_PRES. The program then returns to the main loop which loops back to step 100 so that steps 100, 101, 106, 110, 115 and 116 are repeated until a) the output shaft speed is no longer slower than the desired creeper speed, or b) the pressure applied to the clutch is incremented until the maximum allowable pressure is being applied.

If the load on the output shaft 20 is not too great, each incrementing of CL_PRES at step 116 will result in less clutch slippage and thus a greater output speed. In this case the output shaft speed will increase until it is no longer slower than the desired creeper speed. This condition is then detected at step 110 and the program moves to step 112 as previously described. On the other hand, the load on the output shaft may be so great that the resulting clutch slippage cannot be reduced sufficiently to bring the output shaft speed up to the desired speed. In this case steps 110, 115 and 116 are repeatedly executed until an execution of step 116 increments the clutch pressure to the maximum allowable pressure. The next following execution of step 115 shows that CL_PRES is equal to MAX_PRES and the program returns to the main loop without increasing the clutch pressure. Although the clutch continues to slip, the clutch is capable of dissipating considerable heat and the slipping may continue for some time without damaging the clutch.

Assume now that an execution of step 110 has determined that the output shaft speed is not slower than the desired creeper speed but an execution of step 112 determines that the output shaft speed is faster than the desired creeper speed. The program branches to step 113 to determine if the actual ratio of output to input shaft speed is greater than the output to input shaft speed ratio for low gear where low gear is forward gear 1 if the selected creeper speed is a forward speed and reverse gear R4 if the selected creeper speed is a reverse speed. In executing step 113 the microprocessor 1 divides RPM_OUT by RPM_IN to obtain the actual ratio of output shaft speed to input shaft speed. The result is then compared with one of two values RATIO_1F or RATIO_4R stored in non-volatile memory and representing the forward and reverse low gear ratios. The selection of RATIO_1F or RATIO_4R is determined by whether the selected creeper speed indication in register CG represents a forward or a reverse creeper speed, respectively.

If step 113 determines that the actual output shaft to input shaft speed ratio is not faster than the output to input shaft speed ratio for the low gear, the program then executes step 114 to decrease the clutch pressure by modifying CL_PRES. After step 114 is executed the program returns to the main loop to repeat the loop including steps 100, 101, 106, 110, 112, 113 and 114. Each execution of step 114 decreases the clutch pressure in the active clutch 82 or 83 thus resulting in more slippage with an attendant reduction in the speed of the output shaft. Eventually the clutch pressure is reduced to the point where the output shaft speed is no longer faster than the desired creeper speed. This condition is detected at step 112 and the program returns to the main loop thus bypassing further execution of steps 113 and 114.

If the vehicle in which the transmission is mounted should move onto a downward slope, the vehicle may accelerate due to gravity. The output shaft speed increases and if there is slippage in the active clutch 82 or 83 the ratio of output shaft speed to input shaft speed will become greater than the output to input shaft speed ratio for the low gear selected at step 105. Program step 113 detects this condition and when it is present the program advances to step 116 where CL_PRES is modified to increase the active clutch pressure by a small increment. This reduces slippage in the active clutch and causes clutches and gearing in the transmission as well as the vehicle engine to act as a load on the output shaft thus slowing it down.

After step 116 is executed, the program returns to the main loop. Assuming no shifting of the gearshift lever 6 by the operator, the loop including steps 100, 101, 106, 110, 112, 113 and 116 is executed until an execution of step 113 determines that the output shaft speed has been reduced to the point where the actual output to input shaft speed ratio is no longer greater than the output to input shaft speed ratio for the selected slow gear.

In the embodiment of the control program described above, the speed of the output shaft is controlled toward a constant value so that the speed of the output shaft is independent of the speed of the input shaft. However, according to a second embodiment it is possible to control the speed of the output shaft toward a constant output to input shaft speed ratio so that the desired output shaft speed is a function of the input shaft speed. In this second embodiment a table of ratios is stored in non-volatile memory. The table holds 16 values, one for each of the forward and reverse creeper speeds. Each value represents the desired ratio of output shaft speed to input shaft speed for a respective one of the creeper speeds.

FIG. 4 also illustrates the logic for the second embodiment. The primary differences occur in the details of execution of steps 110 and 112. In step 110, RPM_OUT is divided by RPM_IN to obtain the actual ratio of output to input shaft speed. The value in register CG is used to access the table of ratios to obtain the desired ratio for the selected creeper speed. The desired ratio is then compared with the actual ratio. Step 112 is carried out in exactly the same manner.

While preferred embodiments of the invention have been described in detail for purposes of illustration, it will be understood that various modifications and substitutions may be made in the described embodiments without departing from the spirit and scope of the invention as defined in the appended claims. For example, those skilled in the art of control loop design will readily recognize that in the described comparison steps, provision may be made for "dead-bands" to prevent hunting or oscillating control about a specific value. It is intended therefor that the invention be limited only by the scope of the appended claims.

I claim:

1. In a transmission system having gears and a plurality of clutches for transmitting torque from an input member to an output member said clutches selectively connecting a rotatable input shaft to a rotatable output shaft at one of a plurality of output shaft to input shaft speed ratios including a lowest speed ratio, a method of driving said output shaft at a desired creeper speed such that the ratio of output shaft speed to input shaft speed is less than said lowest speed ratio, said method comprising the steps of:
  a) establishing a value representing said desired creeper speed;
  b) actuating said clutches to select said lowest speed ratio;
  c) sensing the speed of said output shaft to develop an output shaft speed indication;
  d) comparing said value representing said desired creeper speed to said output shaft speed indication; and,
  e) in response to said comparison, controlling one of said clutches so that the torque transmitted by the clutch is reduced when said output shaft speed indication is greater than said value representing said desired creeper speed.

2. The method as claimed in claim 1 and further comprising the step of:
  f) controlling said one of said clutches to increase the torque transmitted through said one of said clutches when said comparison step d) indicates that said output shaft speed indication is less than said value representing said desired creeper speed, whereby said output shaft rotates at said desired creeper speed independent of the rate of rotation of said input shaft.

3. The method as claimed in claim 2 and further comprising the steps of:
  g) establishing a value representing said lowest speed ratio,
  h) sensing the speed of said input shaft,
  i) determining an actual speed ratio from said sensed speeds of said input and output shafts;
  j) comparing the value established in step g) with the actual speed ratio determined in step i) and,
  k) controlling said one clutch to increase the input torque transmitted through said one clutch when the comparison in step j) indicates that said actual speed ratio is greater than said lowest speed ratio, whereby said gears and clutches act as a load to slow the speed of said output shaft.

4. The method as claimed in claim 1 wherein the step of establishing a value representing said desired creeper speed comprises:
  f) establishing a value representing a desired ratio between the output shaft speed and the input shaft speed, said method further comprising
  g) sensing the input shaft speed,
  h) determining from the output shaft speed indication and the sensed input shaft speed the actual ratio of output shaft speed to input shaft speed, comparing the value representing said desired ratio with said actual ratio, and controlling said one clutch to reduce the torque transmitted by said one clutch when said actual ratio is less than said desired ratio.

5. The method as claimed in claim 4 and further comprising the step of:
  i) controlling said one of said clutches to increase the torque transmitted through it when said comparison of the value representing said desired ratio with said actual ratio indicates that said desired ratio is greater than said actual ratio.

6. The method as claimed in claim 2 and further comprising the steps of:
  g) establishing a value representing said lowest speed ratio,
  h) sensing the speed of said input shaft,
  i) determining an actual speed ratio from said sensed speeds of said input and output shafts;
  j) comparing the value established in step g) with the actual speed ratio determined in step i) and,
  k) controlling said one clutch to increase the input torque transmitted through said one clutch when the comparison in step j) indicates that said actual speed ratio is greater than said lowest speed ratio, whereby said gears and clutches act as a load to slow the speed of said output shaft.

7. In a transmission system having gears and a plurality of clutches for transmitting torque from an input member to an output member said clutches selectively connecting a rotatable input shaft to a rotatable output shaft at one of a plurality of output shaft to input shaft speed ratios including a lowest speed ratio, apparatus for controlling said output shaft to rotate at a desired creeper speed such that the ratio of output shaft speed to input shaft speed is less than said lowest speed ratio, said apparatus comprising:
  a) means for storing a value representing said desired creeper speed;
  b) means for actuating said clutches to select said lowest speed ratio;
  c) means for sensing the speed of said output shaft to develop an output shaft speed indication;
  d) comparing means for comparing said value representing said desired creeper speed to said output shaft speed indication; and,
  e) means responsive to said comparing means for controlling one of said clutches so that torque transmitted by said one clutch is reduced when said output shaft speed indication is greater than said value representing said desired creeper speed.

8. A transmission system as claimed in claim 7 wherein said means for storing a value representing said desired creeper speed comprises means for storing creeper speed values representing a plurality of creeper speeds, said transmission further comprising:
  means for selecting a desired one of said creeper speed values,
  said comparing means comprising means for comparing a selected desired one of said creeper speed values to said speed indication.

9. A transmission system as claimed in claim 8 wherein said means for storing desired creeper speed values comprises means for storing a plurality of desired output shaft to input shaft speed ratios, one for each of said plurality of creeper speeds, said transmission system further comprising means for sensing the speed of said input shaft, said comparing means comprising means for computing from said sensed input shaft speed and sensed output shaft speed an actual output to input shaft speed ratio and means for comparing said actual output shaft to input shaft speed ratio with a selected desired output shaft to input shaft speed ratio.

10. A transmission system as claimed in claim 9 and further comprising means for storing an indication of said lowest speed ratio, second comparing means for comparing said actual output shaft to input shaft speed ratio with said lowest speed ratio, and means for increasing the torque transmitted through one of said clutches when said lowest speed ratio is less than said actual output shaft to input shaft speed ratio.

11. A transmission system as claimed in claim 7 wherein said means for actuating said clutches comprises means for actuating said clutches in a first combination to connect said input shaft to said output shaft in a forward driving relationship, or in a second combination to connect said input shaft to said output shaft in a reverse driving relationship.

* * * * *